April 6, 1926.
C. M. HIND
1,579,610
DIRIGIBLE HEADLIGHT ATTACHMENT FOR AUTOMOBILES
Filed June 2, 1925     2 Sheets-Sheet 1
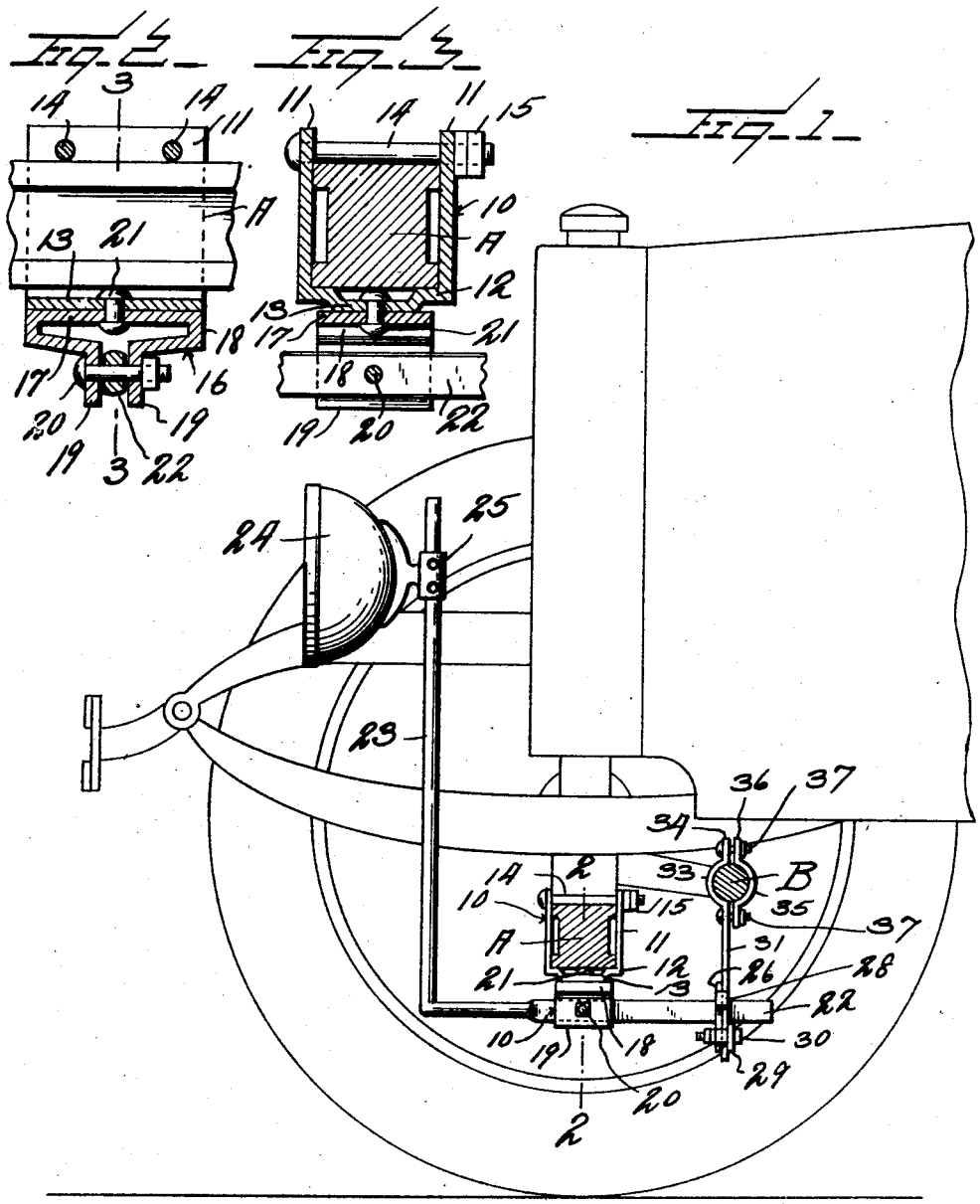
Inventor
C. M. Hind
By Watson E. Coleman
Attorney

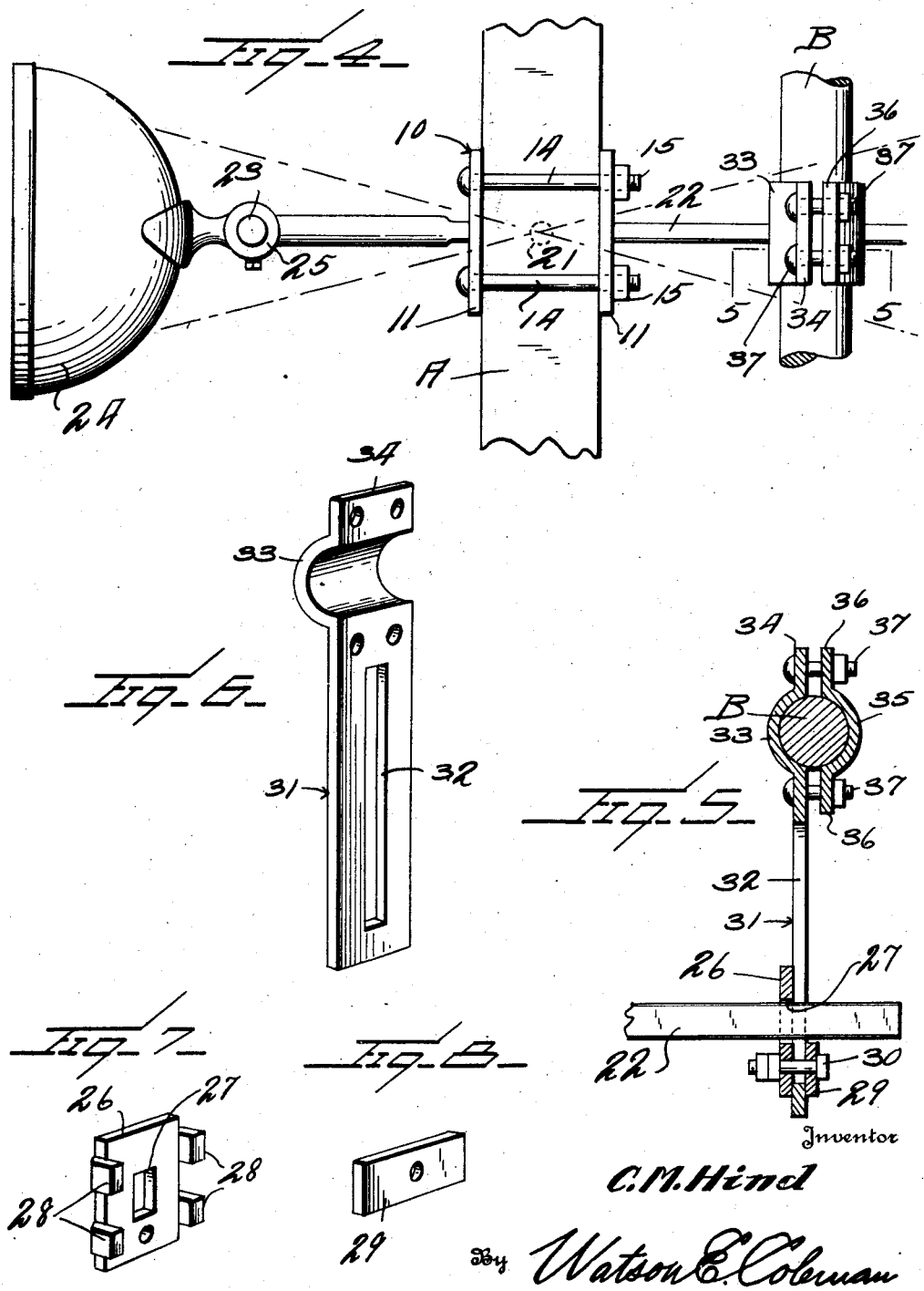

Patented Apr. 6, 1926.

1,579,610

UNITED STATES PATENT OFFICE.

CECIL MARTEL HIND, OF SEATTLE, WASHINGTON.

DIRIGIBLE HEADLIGHT ATTACHMENT FOR AUTOMOBILES.

Application filed June 2, 1925. Serial No. 34,456.

*To all whom it may concern:*

Be it known that I, CECIL MARTEL HIND, a subject of the King of England, residing at Seattle, in the county of King and State of Washington, have invented certain new and useful Improvements in Dirigible Headlight Attachments for Automobiles, of which the following is a specification, reference being had to the accompanying drawings.

This invention relates to means for supporting spotlights or headlights so that the spotlight shall automatically turn in one direction or the other as the front wheels are turned in steering.

The general object of the invention is to provide a device of this character which is extremely simple, which may be readily applied to practically all makes of automobiles, which consists of relatively few parts and these of a simple character, and which is thoroughly effective for the purpose intended.

A further object is to provide a device of this character in which the light may be adjusted to direct the beams downward onto the ground without regard to the depression or elevation of the steering bar or rod connecting the knuckles of the two wheels with relation to the axle so that not only may the headlight or spotlight be adjusted so as to throw the light to any desired extent ahead of the vehicle but, as before remarked, the device will be applicable to a large variety of different cars.

A still further object is to provide a deflecting structure for lamps of such character that the mechanism may be attached to those parts of the car which are practically standard in all cars.

Another object is to provide a device of this character which is so arranged that it is disposed practically beneath the front axle so that the base of the radiator will not bump against the directing attachment.

Still another object is to provide a device of this character which does not require that the shield in front of the front axle be cut away and which at the same time will not require that the headlight or spotlight shall be disposed so near either wheel as to collect mud or dust.

Other objects will appear in the course of the following description.

My invention is illustrated in the accompanying drawings, wherein:—

Figure 1 is a side elevation of an automobile with the axle and steering rod in section, showing my dirigible headlight applied thereto;

Figure 2 is a section on the line 2—2 of Figure 1;

Figure 3 is a section on the line 3—3 of Figure 2;

Figure 4 is a fragmentary top plan view of the axle and steering rod showing my invention applied thereto;

Figure 5 is an enlarged section through the steering rod and through the clamps of the steering rod bar;

Figure 6 is a perspective view of the steering rod bearing 31;

Figure 7 is a perspective view of the clamp 26;

Figure 8 is a perspective view of the clamp member 29.

In the drawings, A designates the front axle of a motor car, this front axle being practically standard in almost all makes of cars and requires no description. Disposed rearward of the front axle and illustrated as disposed somewhat above the front axle is the tie rod or steering rod B which connects the knuckles of the two front wheels and which is also standard on practically all makes of cars.

My attachment includes a clamp 10 which is U-shaped in cross section to provide oppositely disposed, upwardly extending, parallel walls 11 extending upward on each side of the axle and a transversely extending cross bar 12, the middle portion of which is depressed, as at 13. The upper ends of the blades 11 or side walls are perforated for the passage of a plurality of bolts 14 having nuts 15 whereby these side walls may be drawn together to clamp them upon the axle, as is clear from Figure 1.

Disposed below the clamp 10 is a second clamp, designated generally 16, which is intended to clamp upon a bar which supports, as will be later described, the spotlight. This clamp is formed to embrace said bar and, therefore, consists of a base plate 17, two side walls 18 extending therefrom, then extending inward and slightly outward from each other, and then extending parallel to each other, as at 19. These parallel portions of the two sides walls are engaged by a bolt whereby this clamp may be contracted upon the lamp supporting bar. A pivot in the form of a rivet 21 engages the depressed portion 13 of the clamp 10 with the upper web 17 of the clamp 16 so that this clamp 16 is swiveled or rotatably supported with relation to the clamp 10 and below the latter. The depression 13, of course, accommodates the head of this rivet or like member 21, as illustrated in Figure 3.

Disposed through this clamp 16 and adjustable therethrough is a lamp supporting bar 22 which may have any suitable cross section but which, of course, has a cross section which may be clampingly engaged by the clamp 16. The forward end of this member bar 22 which may have any suitable cross section 23, though I do not wish to be limited to this, and supports upon it the spotlight or headlight 24 whose construction forms no part of my invention. I have illustrated the lamp housing as formed with a sleeve 25 which embraces the upwardly extending portion 23 of this bar. The rear end of the bar 22 carries upon it one member 26 of a clamping device which comprises a plate having an aperture 27 passing therethrough, through which the bar 22 extends, this plate being formed with the upper and lower guide lugs 28 extending at right angles to the plate. Below this aperture 27 the plate 26 is apertured for the passage of a bolt, and adapted to be disposed between the lower guide lugs is a clamping plate 29 also apertured for the passage of the bolt 30.

Coacting with this clamp bar of the members 26 and 29 is a vertically extending bar 31 which is vertically slotted at 32 and which is of such width that it will be engaged between the lugs 28, the slot 32 permitting the passage of the bolt 30 and also permitting the passage of the bar 22. The upper end of this member 31 is outwardly bowed at 33 and then extended upward to form an ear 34. Opposed to this outwardly bowed portion 32 is a cap 35 which is also outwardly bowed to correspond with the portion 33 and is formed with the ears 36. Bolts 37 pass through these ears and through the ear 34 and the body of the member 31 so that this clamp formed of the members 31 and 35 may be clamped upon the steering rod B, as disclosed in Figure 1.

In use of this device, the member 31 is clamped upon the steering rod B, as above described, and the rod 22 passed through it. The clamp formed of the members 26 and 29 is shifted so as to cause this rod 22 to be exposed in a horizontal relation. The clamp 10 is clamped upon the axle A in an obvious manner. It will be seen now that as the steering rod B, through the action of the steering mechanism, oscillates the steering wheels, the member 31 will transmit this motion to the lamp supporting member and this lamp supporting member will rotate upon the pivot formed by the rivet 21 so that the lamp will be directed in the same direction as the steering wheels of the automobile. The bar 22, as will be noted, is disposed between the depending ears 19 of the member 16 and the bolt 20 passes through this bar. Therefore, it is obvious that the bar may be raised or lowered and by raising or lowering the clamp formed of the members 26 and 29 the bar may be either shifted with its forward end downward or shifted with its forward end upward or disposed in a horizontal position. Thus the rays from the lamp may be directed downward upon the road at any position in advance of the car, either near to the car or farther from it. Obviously also the adjustability of the clamp formed of the members 26 and 29 and the pivoting of the bar 22 permits the attachment to be adjusted in accordance with the position of the steering bar B of any particular machine or make of car with reference to the axle of the machine, thus rendering the device adaptable to a large variety of different cars.

It will be noted also that almost all of the attachment is disposed beneath the axle A and thus is not liable to be struck by the forward end of the radiator as the body of the car descends upon the chassis under shocks by forming the forward end of the bar 22 with an upwardly extending portion or gooseneck upon which the lamp itself is mounted. The light is supported in the proper position without liability of becoming covered with mud or dust.

Many dirigible headlights have been proposed but all of these, as far as I know, are open to objection that they can not be attached anywhere toward the middle of the front axle, as this would necessitate the cutting away of the splash apron in front of the front axle, a mutilation which the average motorist would not be likely to contemplate. Neither is it desirable to install a construction of this kind in a position between wheels and fender inasmuch as manufacturers have learned by experience that this is extremely unsatisfactory, the lamp being so near the road and so near the wheel as to be liable to collect mud and dust. My dirigible headlight mechanism is adapted for attachment under the axle and anywhere on the axle without any cutting of the metal and without any change in any structure and at the same time is not liable to be covered with dust or mud, need not obstruct the regular headlights in case these are used, and, as before remarked, is adaptable to a large variety of cars.

By extending the forward end of the bar 22 upward at a point about two inches in advance of the radiator and to about the center of the radiator, the lamp will be so positioned as to be out of the dust and dirt and also to shine over the bumper if one is attached to the car. It is obvious that while my device is preferably disposed so that the bar 22 and the member 16 are disposed below the axle that these parts might be reversed so as to dispose the member 16 and the bar 22 above the axle. It is also to be noted that the ears 19 should clamp the bar 22 snugly and firmly after once the spotlight or headlight has been adjusted so that there can be no oscillation of the bar 22 after once it is adjusted, and the adjustment should be such that while there will be free turning of the members upon the swivel 21, there will be no undue and unnecessary vibration. It will be understood, of course, that the bar 22 which supports the lamp may have its forward portion arranged in any desired relation to the front of the machine and that while I have shown this bar as being turned upward, as at 23, I do not wish to be limited to this arrangement, though I believe it to be preferable. Neither do I wish to be limited to the exact details of construction, as these might be modified in many ways without departing from the spirit of the invention.

I claim:—

1. A lamp deflecting attachment for automobiles comprising an axle-clamping member, a clamp swiveled thereto for oscillation in a horizontal plane, a lamp supporting bar disposed in said clamp and adjustable longitudinally therethrough, a transmission member formed at its upper end with a clamp adapted to engage the steering rod of an automobile, said transmission member being vertically slotted, and a clamp disposed at the lower end of the transmission member and through which said lamp supporting bar passes, the clamp being adjustable vertically upon the transmission member.

2. A lamp deflecting attachment of the character described comprising a clamp adapted to embrace and clamp upon the forward axle of an automobile, a second clamp pivotally engaged with the lower end of the first named clamp for rotation in a horizontal plane, a bar supported within said second named clamp and pivotally mounted thereon for pivotal adjustment in a vertical plane, a vertically disposed transmitting member having a vertically disposed slot and at its upper end provided with a clamp engageable with the steering rod of the automobile, and a clamp mounted upon the lower end of the transmitting member having an aperture through which said lamp supporting bar passes and clamping upon the transmitting member and being vertically adjustable thereon.

3. A lamp deflecting attachment for automobiles comprising a U-shaped clamp adapted to embrace the front axle of an automobile and including a transverse portion adapted to be disposed below the axle, a second clamp having two opposed members and pivotally engaged with the cross bar of the first named clamp for rotation in a horizontal plane, a bolt passing through the opposed members of the second named clamp, a lamp supporting bar disposed between said members and pivotally engaged with said bolt whereby the lamp supporting bar may be adjusted in a vertical plane, a power transmitting member comprising a strip of metal formed at its upper end to provide a clamp adapted to be engaged with the steering rod of the automobile, the lower portion of said member being vertically slotted to permit the passage of said lamp supporting bar, and a clamp mounted upon said member and having an aperture through which the bar passes, said clamp being adjustable upon the transmitting member.

4. A lamp deflecting attachment for automobiles comprising a U-shaped clamp adapted to embrace the front axle of an automobile and including a transverse portion adapted to be disposed below the axle, a second clamp having two opposed members and pivotally engaged with the cross bar of the first named clamp for rotation in a horizontal plane, a bolt passing through the opposed members of the second named clamp, a lamp supporting bar disposed between said members and pivotally engaged with said bolt whereby the lamp supporting bar may be adjusted in a vertical plane, a power transmitting member comprising a strip of metal formed at its upper end to provide a clamp adapted to be engaged with the steering rod of the automobile, the lower portion of said member being vertically slotted to permit the passage of said lamp supporting bar, a clamp mounted upon said member and having an aperture through which the bar passes, said clamp being adjustable upon the transmitting member comprising a plate having an aperture through which the bar passes and provided with ears engaging on each side of said power transmitting member, and a second plate opposed to the first named plate and adapted to be disposed against the other face of the power transmitting member, and a bolt passing through the two plates.

5. A lamp deflecting attachment for automobiles including a lamp supporting bar adapted to extend forwardly and rearwardly in a horizontal plane below the front axle of the automobile, means for supporting said bar upon the front axle and permitting the bar to be oscillated either in a horizontal plane or tiltably adjusted in a vertical plane, a member formed to engage the steering rod of the machine and to engage said lamp supporting bar, and means for vertically adjusting the rear end of the lamp supporting bar upon said member.

6. A lamp deflecting attachment for automobiles including a lamp supporting bar, means for clamping the lamp supporting bar upon the front axle of the automobile and permitting the lamp supporting bar to be oscillated in a horizontal plane or tiltably adjusted in a vertical plane, and means for operatively connecting the rear end of said bar with the steering rod of the machine, said means permitting the vertical adjustment of the rear end of the lamp supporting bar.

7. The combination with an automobile having a front axle and a steering rod rearward of the front axle, of a lamp supporting bar having an upwardly turned forward end, means for detachably supporting the lamp supporting bar upon the front axle and below the same, said means permitting the lamp supporting bar to oscillate in a horizontal plane and be tiltably adjusted in a vertical plane, and means connecting the steering rod with the rear end of the lamp supporting bar for coincident movement in horizontal planes and including means for adjusting the rear end of the lamp supporting bar vertically upon said connecting means.

In testimony whereof I hereunto affix my signature.

CECIL M. HIND.